United States Patent [19]

Crawford

[11] 4,150,688

[45] Apr. 24, 1979

[54] REMOVABLE FLUID TAKE-OFF AND PRESSURE RELEASE COUPLING FOR WASHING MACHINE AND THE LIKE

[75] Inventor: John G. Crawford, Louisville, Ky.

[73] Assignee: General Electric Company, Louisville, Ky.

[21] Appl. No.: 756,234

[22] Filed: Jan. 3, 1977

[51] Int. Cl.² .......................... B05B 1/22; F16K 24/00
[52] U.S. Cl. ..................................... 137/562; 137/583; 285/308; 285/DIG. 25
[58] Field of Search ........... 137/562, 583, 798, 614.06; 251/149.9; 285/305, 308, DIG. 25

[56] References Cited

U.S. PATENT DOCUMENTS

| 3,124,157 | 3/1964 | Krzewina | 285/DIG. 25 |
| 3,593,743 | 7/1971 | Guth | 137/562 |
| 3,630,227 | 12/1971 | Race | 137/562 X |
| 3,635,243 | 1/1972 | Brezosky | 137/562 X |
| 3,929,356 | 12/1975 | DeVincent | 285/305 |
| 4,026,323 | 5/1977 | Goodlaxson | 137/562 |

*Primary Examiner*—William R. Cline
*Attorney, Agent, or Firm*—Radford M. Reams; Bruce A. Yungman

[57] ABSTRACT

A fluid coupling for connecting a portable washing machine to a domestic water faucet comprises a housing defining an unobstructed fluid passage having a lateral discharge port normally closed by a tilt type valve. A sliding detent plate latches the coupling to the faucet and includes an actuating arm for opening the discharge valve at least momentarily in its traverse between latched and unlatched positions.

13 Claims, 9 Drawing Figures

REMOVABLE FLUID TAKE-OFF AND PRESSURE RELEASE COUPLING FOR WASHING MACHINE AND THE LIKE My invention relates to removable fluid couplings, and more particularly to couplings providing quick connection and disconnection between a fluid outlet fixture and a fluid transport conduit or utilization apparatus. The invention is especially useful with high pressure fluid systems and with fluids dangerous if uncontrollably released, as with caustic fluids or fluids at high temperature. The invention finds particular application for removably connecting a portable washing machine, as a dishwasher or the like, to the water supply and shut-off fixture, or faucet, of a household sink or basin.

BACKGROUND OF INVENTION

In connecting a portable washing machine or other water utilization apparatus to a household sink faucet, it is desirable that the coupling device provide take-off means for withdrawing water from the faucet for other purposes without disconnecting the machine from the faucet. In addition it is desirable that the coupling device include means for automatically relieving static pressure in the fluid line prior to disconnection, thereby to avoid uncontrolled release of fluid at the point of coupling during disconnection.

A number of coupling devices providing such functions have previously been devised. For example, U.S. Pat. Nos. 3,635,243-Brezosky, 3,630,227-Race and 3,593,743-Guth all disclose quick release faucet couplings which include a water take-off valve automatically operable upon decoupling to relieve static fluid pressure and operable independently to withdraw water through a tap outlet while the coupling remains in connected position. These couplings, however, while functionally satisfactory, are mechanically complex and thus expensive to manufacture and maintain.

Accordingly, it is a general object of my invention to provide an improved coupling device of the foregoing type which contains a minimum number of parts and is inexpensive to manufacture and maintain.

It is a more particular object of my invention to provide a quick release faucet coupling of the take-off and pressure release type in which a manually operable slider serves directly as a coupling detent and also acts directly to actuate an auxilliary take-off and pressure release valve.

SUMMARY OF INVENTION

In carrying out my invention in one preferred embodiment I provide a coupling housing defining an unobstructed liquid passageway therethrough for connection of a washing apparatus to a faucet outlet and including a lateral exhaust port in the passageway, a tilt type take-off valve within the lateral port is biased normally to seated closing position. A sliding detent plate within the housing is provided with a keyhole aperture for directly coupling the housing to faucet outlet having a latching shoulder. Actuating means integral with the slider as provided to open the take-off valve at least momentarily when the slider is in transit intermediate its coupled and decoupled positions, thereby to relieve static pressure in the coupling after the faucet valve is closed. By holding the slider in its intermediate pressure release position the take-off valve may be opened to withdraw water without decoupling the housing. In an improved form the slider may have a fourth position beyond its coupled operating position in which it opens the take-off valve wholly independently of decoupling motion.

BRIEF DESCRIPTION OF THE DRAWINGS

My invention will be more fully understood and its various objects and advantages further appreciated by referring now to the following description taken in conjunction with the accompanying drawing in which:

FIG. 6-a is a plan view of the slider in the coupling of FIG. 6;

DESCRIPTION OF PREFERRED EMBODIMENTS

Figure 1:
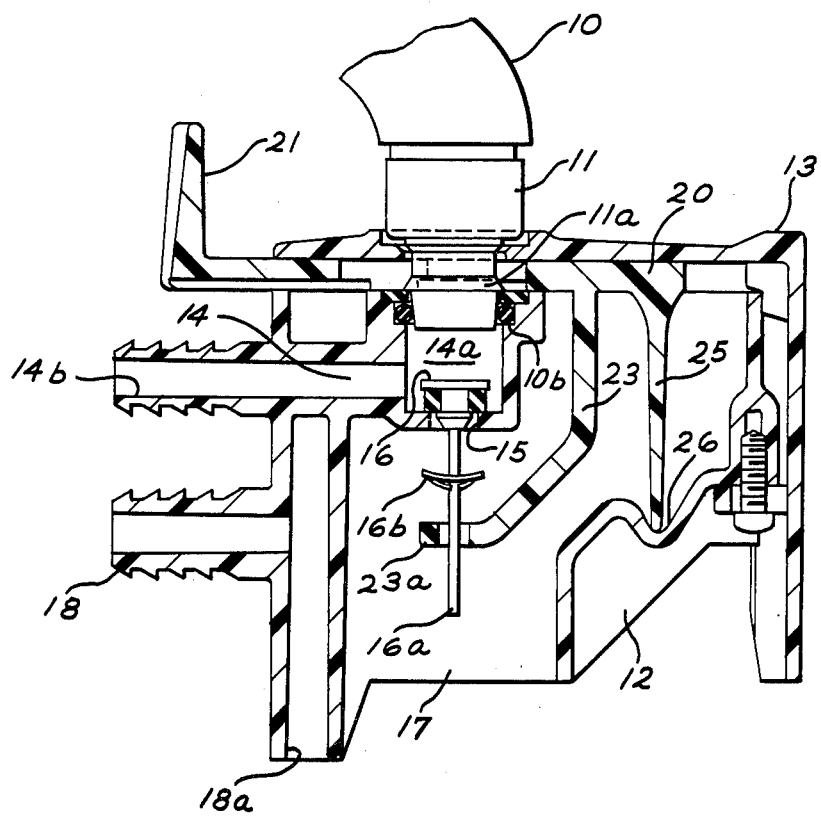
FIG. 1 is a cross-sectional side view of a coupling assembly embodying my invention in one preferred form and showing the sliding detent in coupled operating position latched to a faucet outlet.
Figure 2:
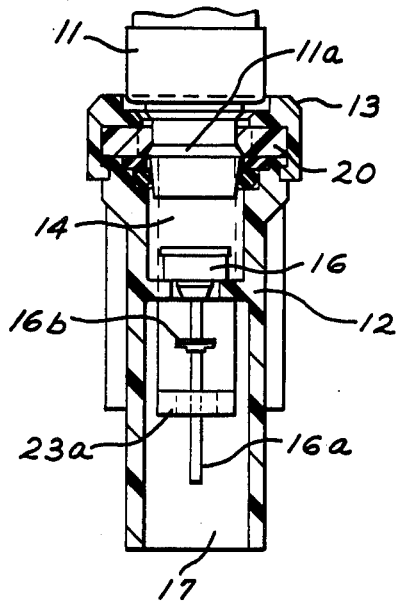
FIG. 2 is a vertical cross-sectional end view of the coupling taken on the line 2—2 of FIG. 1.
Figure 3:
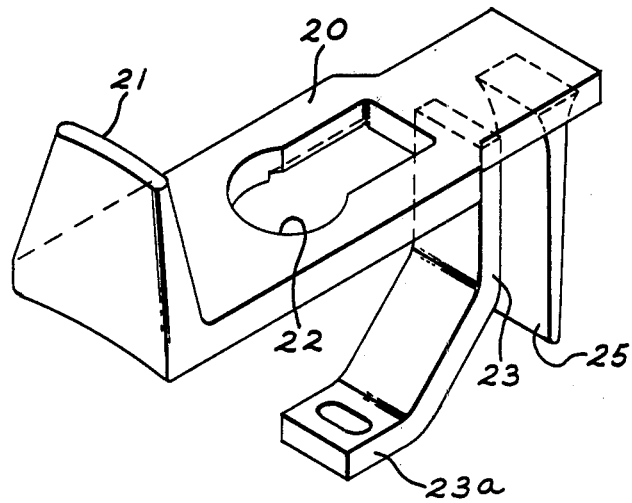
FIG. 3 is a perspective view of the sliding detent in the coupling of FIGS. 1 and 2.

Referring now to the drawings, and particularly to FIGS. 1, 2 and 3, I have illustrated a coupling assembly for connecting a washing machine to a tubular fluid outlet fixture such as a faucet 10 including a shut-off valve (not shown) and fitted with an adapter 11, having a latching shoulder 11a.

The coupling assembly comprises a housing including a base or body portion 12 and a cap 13, the body portion 12 defining a plurality of fluid passages therethrough. A first main fluid passage 14 has its inlet end 14a connected by a sealing ring 10b to the faucet adapter 11 and an outlet end 14b adapted to be connected through a hose or other transport conduit to a dishwasher or like portable washing apparatus. Between its inlet and outlet ends the fluid passage 14, 14a is unobstructed by any closure means but is provided with a lateral outlet port 15 normally closed by a valve 16 biased to closed position. In the embodiment shown at FIGS. 1 to 5 the valve 16 is biased to closed position by gravity, but it will be understood by those skilled in the art that such bias may be provided by suitable spring means or by water pressure alone. At its lower side the valve 16 is provided with a stem 16a extending into the housing and carrying a retaining washer 16b.

The body portion 12 of the housing defines also a fluid take-off passage 17 between the take-off port 15 and a discharge outlet disposed to discharge into a sink below the faucet 10. The body portion 12 of the housing is further provided with a drain passage 18 adapted for connection to the outlet of a washing machine and having an exhaust outlet 18a positioned to discharge into the sink.

At the top of the housing portion 12 and beneath the cap 13 there is provided a slidable latching detent 20 having an actuating handle 21 and illustrated in greater detail at FIG. 3. The slider 20 is a flat plate slidable horizontally in the positions shown at FIGS. 1, 4 and 5. The handle 21 extends upwardly at one end of the plate and intermediate its ends the slider 20 is provided with a keyhole shaped slot 22, the end of the slot proximate the handle 21 being enlarged to receive the faucet latching shoulder 11a.

Fixed to the lower side of the sliding detent plate 20 and extending into the housing body 12 there is provided a curved actuating arm 23 having an apertured free end 23a into which the valve stem 16a extends.

The sliding detent plate 20 is also provided on its lower side and at its end opposite the handle 21 with a resilient biasing finger 25 which extends downwardly into the housing body 12 into a positioning notch 26 formed in the housing body. The biasing finger 25 may be made of resilient metal or resilient plastic and when unstressed, as shown at FIG. 1, it holds the sliding detent 20 in a normal operating position with the narrow part of the keyhole slot 20 embracing the latching shoulder 11a of the faucet adapter 11. This is the connected or operating position of the slider 20 as shown in FIG. 1.

Figure 4:
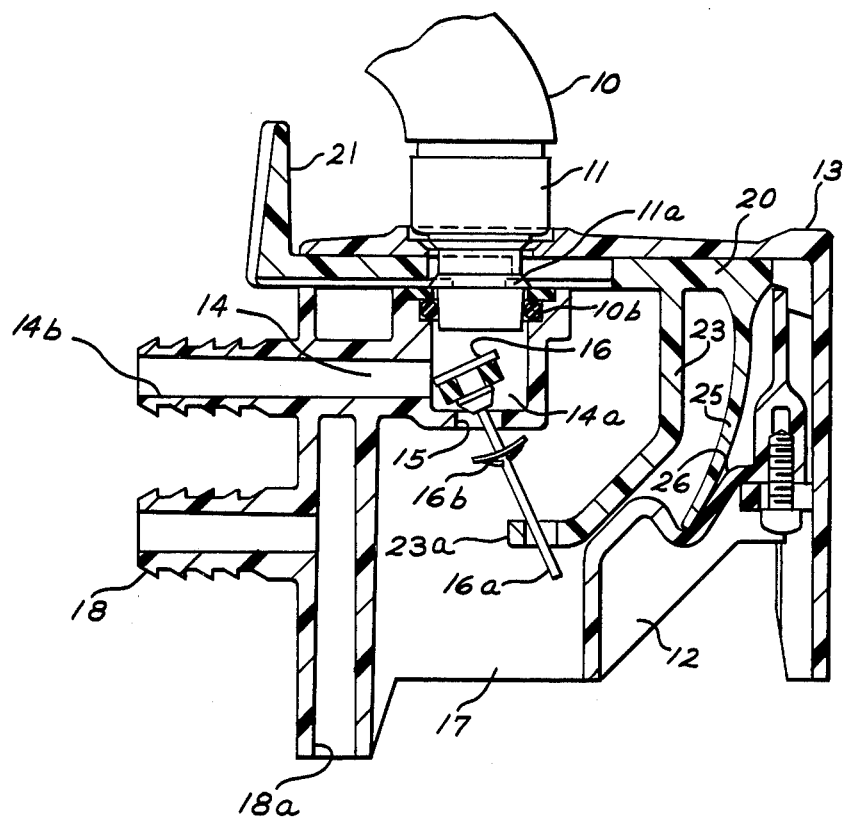
FIG. 4 is a sectional view of the coupling shown in FIG. 1 with the slider in its coupling and decoupling position.

As shown at FIG. 4 the slider 20 is adapted to be manually moved to the right against the bias of the resilient finger 25 to a coupling and decoupling position in which the enlarged end of the keyhole slot 22 is aligned with the hole in cover 13 and the faucet adapter 11, thereby to disengage the sliding detent plate 20 from the latching shoulder 11a. In the coupling and decoupling position shown at FIG. 4, the valve actuating finger 23, 23a fixed to the slider 20 has been moved to the right, and by its engagement with the valve stem 16a has tilted the take-off valve 16 to an open position. In this position also the resilient finger 25 has been laterally deformed so that it biases the slider 20 toward the left for return to its coupled operating position when the handle 21 is released by the operator.

It is to be noted that in the disconnecting movement of slider 20 to the right as shown at FIG. 4 the valve actuating arm 23 on the slider 20 moves the take-off valve 16 to a tilted open position at some intermediate point in its traverse between the latched operating position (FIG. 1) and the unlatched decoupling position (FIG. 4). In such traverse of the slider, therefore, the valve 16 is tilted to open position prior to decoupling between the faucet adapter 11 and the sliding detent plate 20. Such decoupling movement is normally carried out after the faucet valve (not shown) has been closed, so that a certain amount of residual static pressure exists in the coupling passage 14 and the outlet end of the faucet 10. By thus tilting the valve 16 to open position during the decoupling movement of slider 20 the static pressure is relieved and a small amount of fluid ejected through the lateral port 15.

It will be evident to those skilled in the art that, if desired, the slider 20 may be manually held in the intermediate pressure release position between its coupled operating position (FIG. 1) and its fully decoupled position (FIG. 4) thereby to manually draw water from the faucet 10 through the port 15 and passage 17 without full decoupling of the housing 12, 13 from the faucet. In order more conveniently to draw water from the faucet 10 through the auxilliary take-off port 15 without decoupling the housing 12, 13, I provide sufficient elongation of the narrow end of the detent slot 22 to permit movement of the slider 20 to the left, as viewed at FIG. 1, to a manual take-off position shown at FIG. 5. This fourth position for manual take-off is a remote end position opposite the decoupling end position (FIG. 4) and beyond the fully coupled operating position of FIG. 1.

Figure 5:
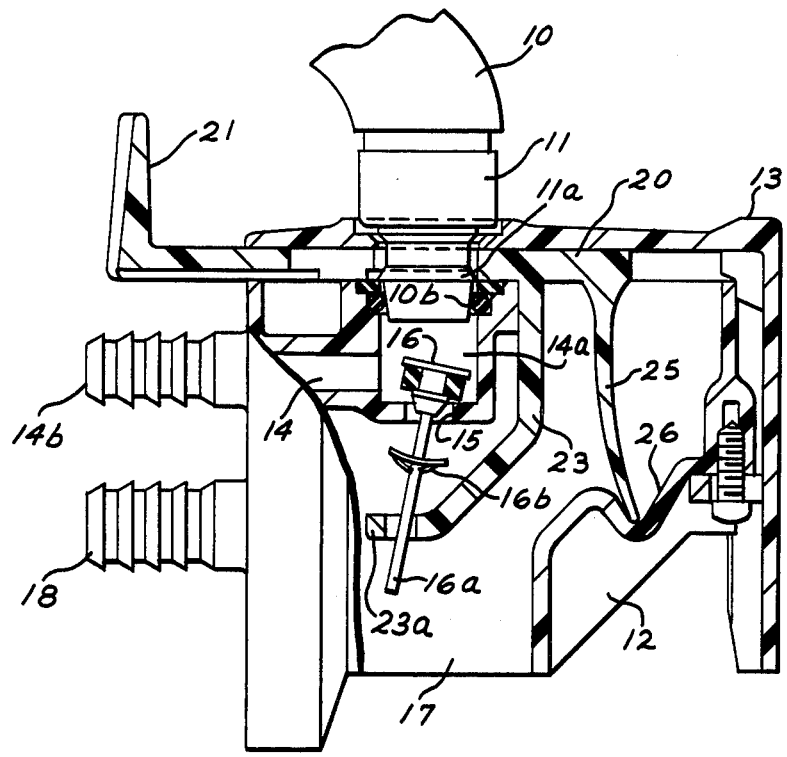
FIG. 5 is a cross-sectional side view of the coupling shown at FIG. 1 with the slider in a fluid take-off position independent of its coupling and decoupling traverse.

At FIG. 5 the apparatus of FIG. 1 is shown with the slider 20 at its extreme left position, with the resilient biasing finger 25 laterally deformed from its neutral or mid-position in a direction opposite to that shown at FIG. 4. In this end take-off position the valve actuating arm 23, 23a is moved to the left with respect to its mid-position of FIG. 1, thereby to tilt the valve 16 to an open position in the opposite direction from that shown at FIG. 4. In this position of the slider it remains in latching engagement with the shoulder 11a on the faucet adapter 11. It will, of course, be understood that when the handle 21 is released the resilient finger 25 returns the slider 20 to its normal operating mid-position as shown in FIG. 1.

Figure 6:
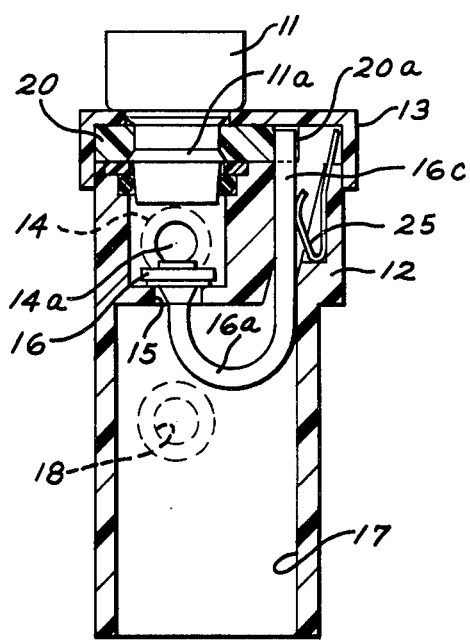
FIG. 6 is a vertical cross-sectional end view similar to that of FIG. 2 of a coupling assembly embodying my invention in modified form.
Figure 6A:
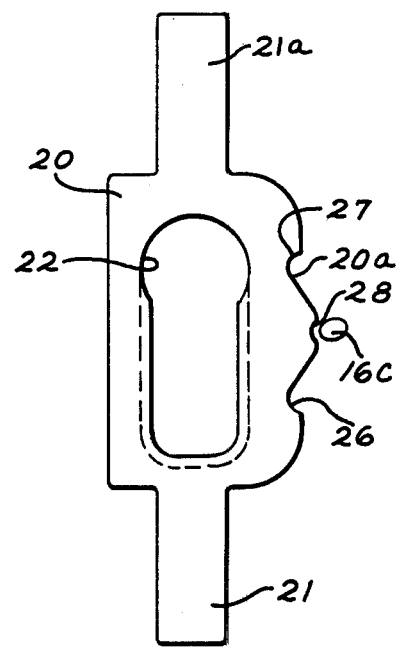

At FIGS. 6 and 6a I have shown another embodiment of my invention in which parts corresponding to like parts shown at FIGS. 1 to 5 have been assigned the same reference numerals. At FIG. 6 the discharge passage 18 is shown as in communication with the outlet 17, and the slider 20 is movable perpendicular to plane of the drawing.

In FIG. 6 the stem 16a of the take-off valve 16 is U-shaped with an upwardly extending end 16c positioned as a cam follower in juxtaposition (FIG. 6a) to a notched camming surface 20a along one side of the sliding detent 20. As at FIG. 3 the sliding detent 20 is provided with a keyhole slot 22 but is movable without bias between a coupling and decoupling position at one end of its traverse and a coupled operating position at the opposite end. The actuating arm 16c of the valve stem 16a is biased against the cam surface 20a of the slider 20 by a hairpin spring 25 within the housing body 12. The cam surface 20a is provided with spaced apart deep notches 26, 27 defining, respectively, the latched and decoupling positions of the slider and with a shallow notch 28 defining an intermediate pressure release, of fluid take-off, position in which the valve actuating arm 16c tilted to a valve opening position. For manual movement of the slider 20 in the embodiment shown at FIGS. 6 and 6a, the slider is provided at opposite ends with actuating push buttons 21, 21a, each adapted to extend from one side of the housing cap 13.

It will now be evident that in operation the coupling assembly of FIGS. 6 and 6a is connected to the faucet adapter 11 by moving the slider to one extreme position with the valve actuating arm 16c in the camming notch 27. With the coupling assembly in position over the faucet adapter, the slider 20 is then moved through its intermediate position (with valve arm 16c in the notch 28) to its opposite end position with the valve arm in the notch 26. If it is desired to draw fluid through the take-off port 15 without disconnecting the housing assembly 12, 13 from the faucet 10, the slider 20 is moved to its intermediate position with the valve arm 16c in the shallow notch 28. In this position the keyhole slot 22 is still in latching engagement with the latching shoulder 11a and the valve 16 is in open position due to tilting of the actuating arm 16c. If it is desired to decouple the housing 12, 13 from the faucet 10, the slider 20 may be moved from such intermediate position, or from its operating end position, into the coupling and decoupling position with the valve arm 16c in the notch 27. It will be evident that in any such decoupling movement the valve 16 is necessarily opened in a slider traverse from its latched operating position at one end to a decoupling position at the other end. Such full decoupling movement is normally carried out with the faucet valve (not shown) closed and residual static pressure in the faucet and coupling passage 14. The necessary tilting and opening of valve 16 during the decoupling traverse relieves such pressure and discharges a small amount of fluid through the port 15 into the passage 17.

Figure 7:
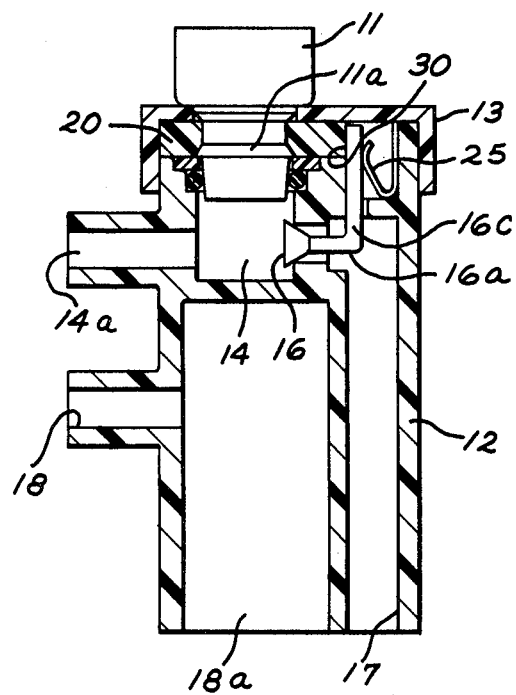
FIG. 7 is a vertical cross-sectional end view of a coupling assembly embodying my invention in another modified form, and FIG. 7-a is a plan view of the slider in the coupling of FIG. 7.
Figure 7A:
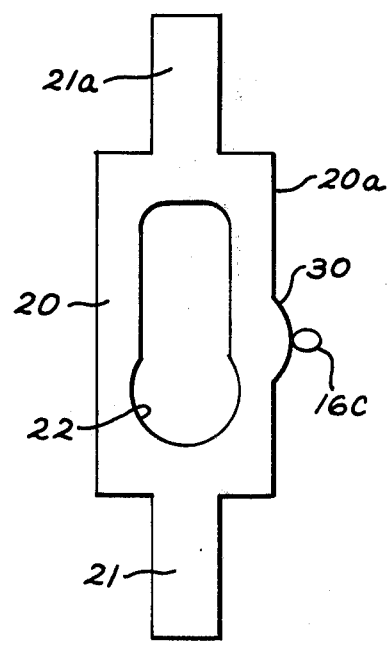

At FIGS. 7 and 7a I have shown still another three position embodiment of my invention in which parts corresponding to those illustrated at FIGS. 1 to 6 have been assigned the same reference numerals. The coupling assembly shown at FIGS. 7 and 7a is similar to that shown at FIGS. 6 and 6a in that the slider is not biased and is actuated by oppositely disposed push buttons 21, 21a between spaced apart extreme end latched and decoupling positions with an intermediate fluid take-off and pressure relief position. At FIGS. 7 and 7a, the intermediate position is defined by a protruding cam surface 30 on one side of the slider 20 (FIG. 7a). At FIG. 7, 7a the actuating extension 16c on the valve stem 16a extends into juxtaposition with the camming edge 20a of the sliding detent 20 and is biased against the detent by either a hairpin or a coil spring 25, as at FIG. 6. It will be understood that, in operation, the sliding detent 20 of FIG. 7, when moved to its extreme forward position (out of the plane of the paper) is in the latched or operating position; when moved to the extreme rearward position (into the plane of the paper) it is in its coupling and decoupling position; when in an intermediate position where the camming shoulder 30 engages and tilts the valve actuating arm 16c the valve 16 is tilted to open position in the same manner as described in connection with FIGS. 6 and 6a.

While I have shown and described only certain preferred embodiments of my invention by way of illustration, many modifications will occur to those skilled in the art. I, therefore, wish to have it understood that I intended in the appended claims to cover all such modifications as fall within the true spirit and scope of my invention.

What is claimed is:

1. A fluid coupling assembly for connecting fluid utilization apparatus to a tubular fluid supply and shut-off fixture having a latching shoulder, said assembly comprising:
   (a) a housing having spaced-apart fluid inlet and outlet ports and defining an unobstructed fluid passage therebetween, said passage having an auxiliary outlet port formed therein;
   (b) valve means operative to open and close said auxiliary port;
   (c) a slidable detent plate having a longitudinal slot, said slot having an enlarged portion for permitting passage of said latching shoulder for coupling and decoupling said fluid inlet and said fixture, and a narrow portion for engaging said latching shoulder, said detent plate being movable in a direction substantially normal to said latching shoulder;
   (d) said detent plate being movable in a first direction from a normally latched operating position, in which said latching shoulder is engaged by said slot and said valve means is closed, to an intermediate position for opening said auxiliary port, said detent plate being further movable in said first direction to a coupling and decoupling position, in which said latching shoulder is aligned with said enlarged portion of said slot; and
   (e) valve actuating means fixed to said detent plate for opening said valve means as said detent plate moves through said intermediate position between said normally latched operating position and said coupling decoupling position.

2. A fluid coupling assembly according to claim 1, wherein said detent plate is movable in a second direction from said normally latched operating position to a fluid take-off position in which said latching shoulder abuts an end of said slot remote from said enlarged portion of said slot; said valve actuating means opening said valve means when said detent plate moves to said fluid take-off position.

3. A fluid coupling assembly according to claim 2 including resilient means for biasing said sliding detent plate to its normally latched operating position.

4. A fluid coupling assembly according to claim 1 including resilient means for biasing said sliding detent plate to its normally latched operating position.

5. A fluid coupling assembly according to claim 4 wherein said resilient biasing means comprises a transversely resilient finger fixed to and extending laterally from said sliding detent plate and said housing includes positioning means holding the free end of said finger in fixed position.

6. A fluid coupling assembly according to claim 5 wherein said sliding detent plate is provided with a keyhole slot disposed to receive and engage said latching shoulder.

7. A fluid coupling assembly according to claim 1, wherein said longitudinal slot has a keyhole shape.

8. A fluid coupling assembly according to claim 1 wherein said housing includes a second fluid passage for receiving fluid discharged from said utilization apparatus.

9. A fluid coupling assembly according to claim 1 wherein said housing includes an auxiliary fluid outlet passage disposed to receive fluid from said auxiliary outlet port.

10. A fluid coupling assembly according to claim 1, wherein said valve actuating mean comprises a valve actuating arm fixed at one end to said detent plate, and having a free end for engaging said valve means.

11. A fluid coupling assembly for connecting fluid utilization apparatus to a tubular fluid supply and shut-off fixture having a latching shoulder, said assembly comprising:
   (a) a housing having spaced-apart fluid inlet and outlet ports and defining an unobstructed fluid passage therebetween, said passage having an auxiliary outlet port formed therein;
   (b) valve means operative to open and close said auxiliary port;
   (c) a slidable detent plate having a longitudinal slot for engaging said latching shoulder, said slot having an enlarged end for permitting passage of said latching shoulder for coupling and decoupling said fluid inlet and said fixture, said detent plate being movable in a plane substantially normal to said latching shoulder from a coupled operating position in which said latching shoulder is aligned with the end of said slot remote from said enlarged end to an intermediate position for opening said auxiliary port, said detent plate being further movable to a coupling and decoupling position in which said latching shoulder is aligned with said enlarged end of said slot;

(d) said detent plate having one longitudinal edge, shaped to provide a cam surface;

(e) said valve means having a valve stem; and (f) said cam surface being arranged to move said valve stem so as to open said valve means as said detent plate moves through said intermediate position.

12. A fluid coupling assembly according to claim 11, wherein said cam surface includes a pair of spaced-apart deep notches, one of said notches being disposed to receive said valve stem when said detent plate is in said coupling and decoupling position and the other being disposed to receive said valve stem when said detent plate is in said coupled operating position, said camming surface further including a shallow notch disposed intermediate said deep notches for receiving said valve stem when said detent plate is in said intermediate position, said valve stem being arranged so as to close said valve means when said stem is in either one of said deep notches and to open said valve means when said stem is in said shallow notch, whereby said auxiliary port is closed when said sliding detent plate is in said coupling and decoupling position or said coupled operating position and said auxiliary port is open when said detent plate is in said intermediate position.

13. A fluid coupling apparatus according to claim 11, wherein said longitudinal slot has a keyhole shape.

* * * * *